US012732743B2

(12) United States Patent
Wang et al.

(10) Patent No.: US 12,732,743 B2
(45) Date of Patent: Sep. 8, 2026

(54) COMBINED AUDIO AND HAPTIC ACTUATOR ASSEMBLY

(71) Applicant: Google LLC, Mountain View, CA (US)

(72) Inventors: Jianxun Wang, Sunnyvale, CA (US); Debanjan Mukherjee, San Jose, CA (US); Che-Yuan Hsu, Taipei city (TW); Zhi Qiang Li, Suzhou (CN); Michael Kai Morishita, Belmont, CA (US)

(73) Assignee: Google LLC, Mountain View, CA (US)

( * ) Notice: Subject to any disclaimer, the term of this patent is extended or adjusted under 35 U.S.C. 154(b) by 226 days.

(21) Appl. No.: 18/562,425

(22) PCT Filed: Feb. 23, 2023

(86) PCT No.: PCT/US2023/013684
§ 371 (c)(1),
(2) Date: Nov. 20, 2023

(87) PCT Pub. No.: WO2023/164037
PCT Pub. Date: Aug. 31, 2023

(65) Prior Publication Data

US 2024/0236553 A1 Jul. 11, 2024

Related U.S. Application Data

(60) Provisional application No. 63/313,092, filed on Feb. 23, 2022.

(51) Int. Cl.
*H04R 23/02* (2006.01)
*H04R 1/24* (2006.01)
*H04R 1/28* (2006.01)

(52) U.S. Cl.
CPC ................. *H04R 1/28* (2013.01); *H04R 1/24* (2013.01)

(58) Field of Classification Search
CPC .. H04R 1/2803; H04R 1/2811; H04R 1/2815; H04R 1/2819; H04R 1/2826;
(Continued)

(56) References Cited

U.S. PATENT DOCUMENTS 8,174,511 B2 * 5/2012 Takenaka .............. G06F 3/0488 345/177
8,378,965 B2 * 2/2013 Gregorio ................. B06B 1/045 715/702
(Continued)

FOREIGN PATENT DOCUMENTS

KR 20110130470 A 12/2011
KR 101361477 B1 * 2/2014 ............... H04R 9/02
KR 20200063496 A * 6/2020 ............. H04R 7/045

OTHER PUBLICATIONS

International Preliminary Report on Patentability in International Appln. No. PCT/US2023/013684, mailed on Sep. 6, 2024, 7 pages.
(Continued)

*Primary Examiner* — Ryan Robinson
(74) *Attorney, Agent, or Firm* — Fish & Richardson P.C.

(57) ABSTRACT

Actuator assemblies, and electronic devices and wearable devices including actuator assemblies, are disclosed. An actuator assembly includes: a first housing enclosing an audio actuator and a first open volume; and a second housing enclosing a haptic actuator and a second open volume. The first open volume is fluidly connected with the second open volume by an aperture between the first housing and the second housing. A first wall of the first housing abuts a second wall of the second housing. The aperture includes a first opening in the first wall of the first housing and a second opening in the second wall of the second housing. The first housing includes a linking component configured to mechanically connect to the second housing. The linking component includes a fluid conduit extending from the first
(Continued)

open volume to an opening in the second wall of the second housing.

18 Claims, 5 Drawing Sheets

(58) Field of Classification Search
CPC .. H04R 1/2842; H04R 1/2849; H04R 1/2873; H04R 1/2888
See application file for complete search history.

(56) References Cited

U.S. PATENT DOCUMENTS

| | | | | |
|---|---|---|---|---|
| 9,564,029 | B2 | 2/2017 | Morrell et al. | |
| 10,154,348 | B2 * | 12/2018 | Afshar | H04R 1/22 |
| 10,667,028 | B2 * | 5/2020 | Ji | H03G 5/165 |
| 10,827,243 | B1 | 11/2020 | Peana et al. | |
| 11,307,661 | B2 * | 4/2022 | Miller | H04R 1/028 |
| 11,889,249 | B2 * | 1/2024 | Liang | H04R 1/44 |
| 2017/0116977 | A1 | 4/2017 | Logan | |
| 2018/0179048 | A1 | 6/2018 | Schenk et al. | |
| 2018/0288202 | A1 * | 10/2018 | Park | B06B 1/06 |
| 2018/0317014 | A1 | 11/2018 | Bellas et al. | |
| 2019/0094973 | A1 | 3/2019 | Miller et al. | |
| 2019/0296674 | A1 | 9/2019 | Janko et al. | |
| 2020/0057503 | A1 | 2/2020 | Seomoon et al. | |
| 2021/0392422 | A1 * | 12/2021 | Crowley | G06F 1/163 |
| 2022/0150619 | A1 * | 5/2022 | Park | H04R 1/2819 |
| 2023/0143417 | A1 * | 5/2023 | Cho | H04R 1/2807 181/151 |

OTHER PUBLICATIONS

International Search Report and Written Opinion in International Appln. No. PCT/US2023/013684, mailed on Jun. 30, 2023, 14 pages.
Lim et al., "Force and displacement analysis of a haptic touch-screen," Paper, Presented at the International Conference on Consumer Electronics, Berlin, Germany, Sep. 6-9, 2015; Proceedings of the International Conference on Consumer Electronics, 2015, pp. 589-591.
Office action in European Appln. No. 23713771.6, mailed on Nov. 24, 2025, 8 pages.

* cited by examiner

COMBINED AUDIO AND HAPTIC ACTUATOR ASSEMBLY

CROSS-REFERENCE TO RELATED APPLICATIONS

This application is a National Stage Application under 35 U.S.C. § 371 and claims the benefit of International Application No. PCT/US2023/013684, filed Feb. 23, 2023 which claims the benefit of priority to U.S. Application No. 63/313,092, filed on Feb. 23, 2022, the contents of which are hereby incorporated by reference.

TECHNICAL FIELD

This specification relates generally to actuators, and in particular to actuators for audio and/or haptic applications.

BACKGROUND

This specification relates to audio and haptic actuators. Many electronic devices are capable of presenting multimedia content by including speakers which provide tonal, voice-generated, and/or recorded output. Dynamic speakers typically require a substantial back volume to achieve the optimum frequency response. Some audio speakers are designed to have a smaller physical size for integration into electronic devices having a range of different sizes (e.g., mobile phones, smart home devices). Due to their small size, these speakers tend to have limited space available for a back volume. The back volume is an open volume of air behind the diaphragm of the speaker. Given that acoustic performance in the low frequency audio range usually correlates directly with the back volume size, small speakers tend to have limited performance in the bass range.

Haptic feedback mechanisms can be used to provide tactile feedback to a user of a device to enhance user experience. Vibration is an example of a haptic feedback mechanism. Vibration can be produced by an acceleration or deceleration of a moving mass, such as through an eccentric rotating mass that is attached to a motor. Vibration can also be produced using piezoelectric materials by applying a time varying voltage to a piezoelectric material. Devices capable of generating haptic responses are referred to as haptic feedback modules. Various consumer electronic devices such as smartphones or gaming controllers contain haptic feedback modules to provide tactile feedback in response to a user input. A haptic feedback module is typically attached to a housing of the device and transfers the generated vibration through the housing to the user.

SUMMARY

Disclosed are actuator assemblies with combined volumes for both audio and haptic actuators. Portable consumer electronics devices, such as mobile phones, have continued to become more and more compact. As the form factor of such devices shrinks, system enclosures become smaller and the space available for speaker integration is reduced. More particularly, the space available for a speaker back volume decreases, and along with it, low frequency acoustic performance diminishes. The effective back volume can be increased by combining a back volume for a haptic actuator with a back volume for an audio actuator, so that both actuators share the same back volume. The disclosed techniques can be implemented to increase the effective back volume of the audio actuator, thereby improving volume efficiency.

In certain embodiments, the disclosed actuator assemblies permit air to flow between an audio speaker and a haptic actuator. The haptic actuator can be, for example, a linear resonant actuator (LRA). In some examples, open air access holes can be added to a housing of a haptic actuator. The open air access holes can align with a customized air box for an adjacent audio speaker. Internal components of the haptic actuator therefore share a common air volume with the back cavity of the audio speaker. Among other advantages, embodiments feature improved audio speaker performance due to the larger effective air volume, and increased battery life due to improved efficiency.

In general, one innovative aspect of the subject matter described in this specification can be embodied in an actuator assembly including: a first housing enclosing an audio actuator and a first open volume: and a second housing enclosing a haptic actuator and a second open volume. The first open volume is fluidly connected with the second open volume by an aperture between the first housing and the second housing. The aperture may be between the first and second housings in that it is formed in one or more surfaces or walls of the housings to fluidly connect the first and second open volumes. Additionally, the aperture between housings may refer to an opening which allows fluid communication between the first and second open volumes.

The first open volume may be defined as the volume of space inside the first housing not occupied by the audio actuator. The first open volume may be a spatial volume defined between the audio actuator and an inner surface of the first housing.

The second open volume may be defined as the volume of space inside the second housing not occupied by the haptic actuator. The second open volume may be defined as the volume of space inside the second housing not occupied by a moving mass of the haptic actuator. The second open volume may be a spatial volume defined between the haptic actuator, e.g., a moving mass of the haptic actuator, and an inner surface of the second housing.

In general, one innovative aspect of the subject matter described in this specification can be embodied in an electronic device including the actuator assembly.

In general, one innovative aspect of the subject matter described in this specification can be embodied in a wearable device including the actuator assembly.

The foregoing and other embodiments can each optionally include one or more of the following features, alone or in combination. In some implementations, a first wall of the first housing abuts a second wall of the second housing.

In some implementations, the aperture includes: a first opening in a first wall of the first housing: and a second opening in a second wall of the second housing.

In some implementations, the first housing includes a linking component configured to mechanically connect to the second housing.

In some implementations, the linking component includes a fluid conduit extending from the first open volume to an opening in a wall of the second housing.

In some implementations, the linking component includes a speaker box including a fluid conduit.

In some implementations, the haptic actuator includes: a moving mass: a plurality of spring structures, including: a first spring structure mechanically coupled to a first side of the moving mass: and a second spring structure mechanically coupled to a second side of the moving mass, the second side being opposite from the first side.

In some implementations, the aperture fluidly connects the first open volume with the second open volume through a portion of the second housing containing one of the plurality of spring structures.

In some implementations, the actuator including a second aperture fluidly connecting the first open volume and the second open volume.

In some implementations, the aperture fluidly connects the first open volume with the second open volume through a portion of the second housing containing the first spring structure: and the second aperture fluidly connects the first open volume with the second open volume through a portion of the second housing containing the second spring structure.

In some implementations, the haptic actuator includes: a coil positioned adjacent to a third side of the moving mass, the third side connecting the first side to the second side.

In some implementations, the aperture fluidly connects the first open volume with the second open volume through a portion of the second housing containing the first spring structure: and the second aperture fluidly connects the first open volume with the second open volume through a portion of the second housing containing the coil.

In some implementations, including a third aperture fluidly connecting the first open volume and the second open volume.

In some implementations, the third aperture fluidly connects the first open volume with the second open volume through a portion of the second housing containing the second spring structure.

In some implementations, the haptic actuator includes: a moving mass; a spring structure mechanically coupling the moving mass to the second housing; and a coil configured to drive oscillation of the moving mass during operation of the haptic actuator. The aperture fluidly connects the first open volume with the second open volume through a portion of the second housing containing at least one of the spring structure or the coil.

In some implementations, the haptic actuator includes: a moving mass; and a spring structure mechanically coupling the moving mass to the second housing at a connection region. The second opening in the second wall of the second housing does not overlap with the connection region.

In some implementations, the aperture has a cross-sectional area of six square millimeters or less.

In some implementations, the haptic actuator includes a linear resonant actuator.

In some implementations, the audio actuator includes a diaphragm, the first housing enclosing: a front volume abutting a first side of the diaphragm: and the first open volume abutting a second side of the diaphragm. The first side of the diaphragm is opposite from the second side of the diaphragm.

In some implementations, the first housing encloses a front volume that abuts a first side of the audio actuator and is vented to the environment; and the first open volume abuts a second side of the audio actuator. The first side of the audio actuator is opposite from the second side of the audio actuator.

In some implementations, the first open volume is fluidly isolated from the front volume.

In some implementations, the first open volume includes a back volume for the audio actuator. A resonance peak of the audio actuator depends at least in part on a size of the back volume.

In some implementations, the fluid connection between the first open volume and the second open volume increases an effective size of the back volume for the audio actuator.

In general, one innovative aspect of the subject matter described in this specification can be embodied in a method for assembling an actuator assembly, including: providing a speaker box including a fluid conduit: joining the speaker box to an audio actuator to fluidly connect a first open volume of the audio actuator with the fluid conduit; and joining the speaker box with a housing enclosing a haptic actuator to fluidly connect a second open volume of the housing with the fluid conduit.

In some implementations, the second open volume of the housing is fluidly connected to the fluid conduit through one or more apertures in a wall of the housing.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1A:
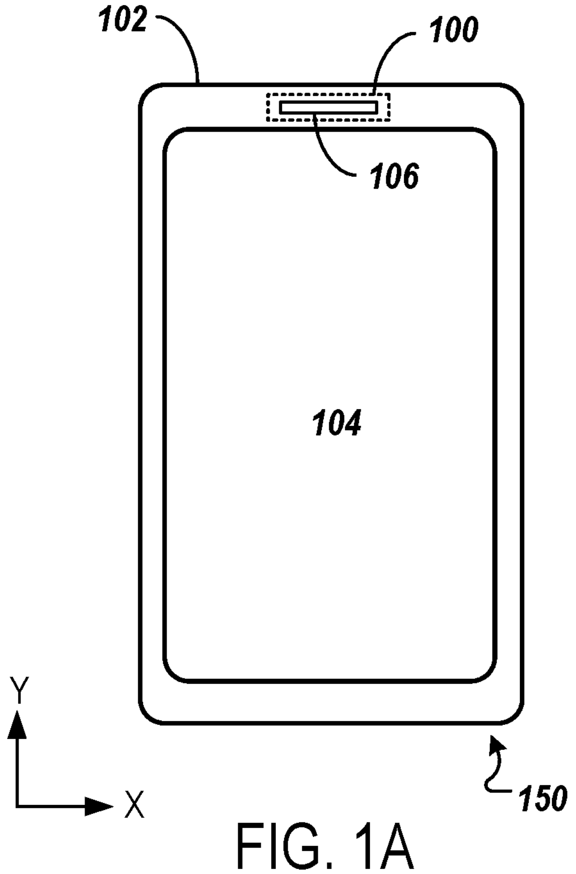
FIG. 1A is an overhead view of an embodiment of a mobile device including an actuator assembly.

In general, the disclosed actuator assemblies can be used in a variety of applications. For example, in some embodiments, actuator assembly 100 is integrated into a mobile device, such as a mobile phone or a handheld game console. Referring to FIG. 1A, a mobile device 150 includes a device chassis 102 and a display 104 including a flat panel display (e.g., an OLED or LCD display panel). Mobile device 150 interfaces with a user in a variety of ways, including by displaying images and receiving touch input via display 104, which may be a touch panel display. Typically, a mobile device has a depth (in the z-direction) of approximately 10 mm or less, a width (in the x-direction) of 60 mm to 80 mm (e.g., 68 mm to 72 mm), and a height (in the y-direction) of 100 mm to 160 mm (e.g., 138 mm to 144 mm).

Mobile device 150 produces audio and haptic output. During operation, the mobile device 150 uses a speaker, such as an audio actuator of actuator assembly 100, to generate audible sound for a user. Such sound can include sound from voice telephone calls, may include recorded sound (e.g., voice messages, music files) and can also include sound generated by applications operating on mobile device 150. Audio output from the actuator assembly can exit the chassis 102 through an aperture 106. The aperture 106 can be an opening in the chassis 102 or display 104.

Figure 1B:
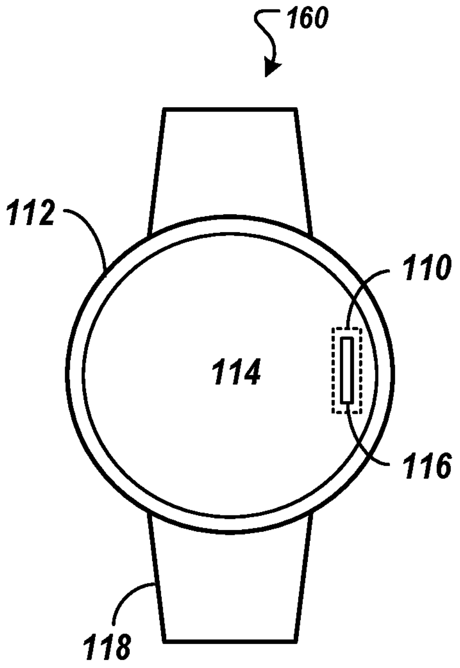
FIG. 1B shows an embodiment of a wearable device including an actuator assembly.

In some embodiments, the disclosed actuator assemblies can be integrated into wearable devices, such as watches. Referring to FIG. 1B, a wearable device 160 includes a device chassis 112 and a display 114. The wearable device 160 includes an actuator assembly 110. The wearable device 160 can be, for example, a smart watch with a watchband 118 that includes two portions connectable with a clasp. The display 114 is mounted in the chassis 112 of the wearable device 160. Audio output from the actuator assembly 110 can exit the chassis 112 through an aperture 116. The aperture 116 can be an opening in the chassis 112 or display 114.

Figure 2:
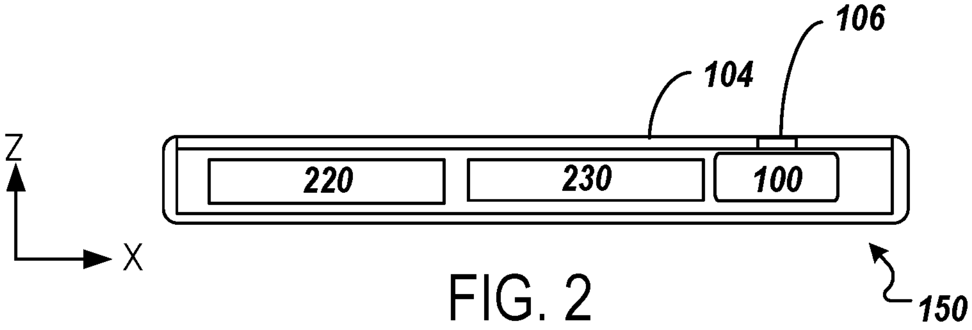
FIG. 2 is a schematic cross-sectional view of the mobile device of FIG. 1A.

Referring to FIG. 2, a cross-section of mobile device 150 illustrates device chassis 102 and display 104. Device chassis 102 has a depth measured along the z-direction and a width measured along the x-direction. Device chassis 102 also has a back panel, which is formed by the portion of device chassis 102 that extends primarily in the x-y plane. Mobile device 150 includes actuator assembly 100, which is housed in chassis 102 and positioned adjacent to the aperture 106. Generally, actuator assembly 100 is sized to fit within a volume constrained by other components housed in the chassis, including an electronic control module 220 and a battery 230.

In general, the disclosed speakers are controlled by an electronic control module (e.g., electronic control module 220). In general, electronic control modules are composed of one or more electronic components that receive input from one or more sensors and/or signal receivers of the mobile phone, process the input, and generate and deliver signal waveforms that cause actuator assembly 100 to provide audio output.

Figure 3:
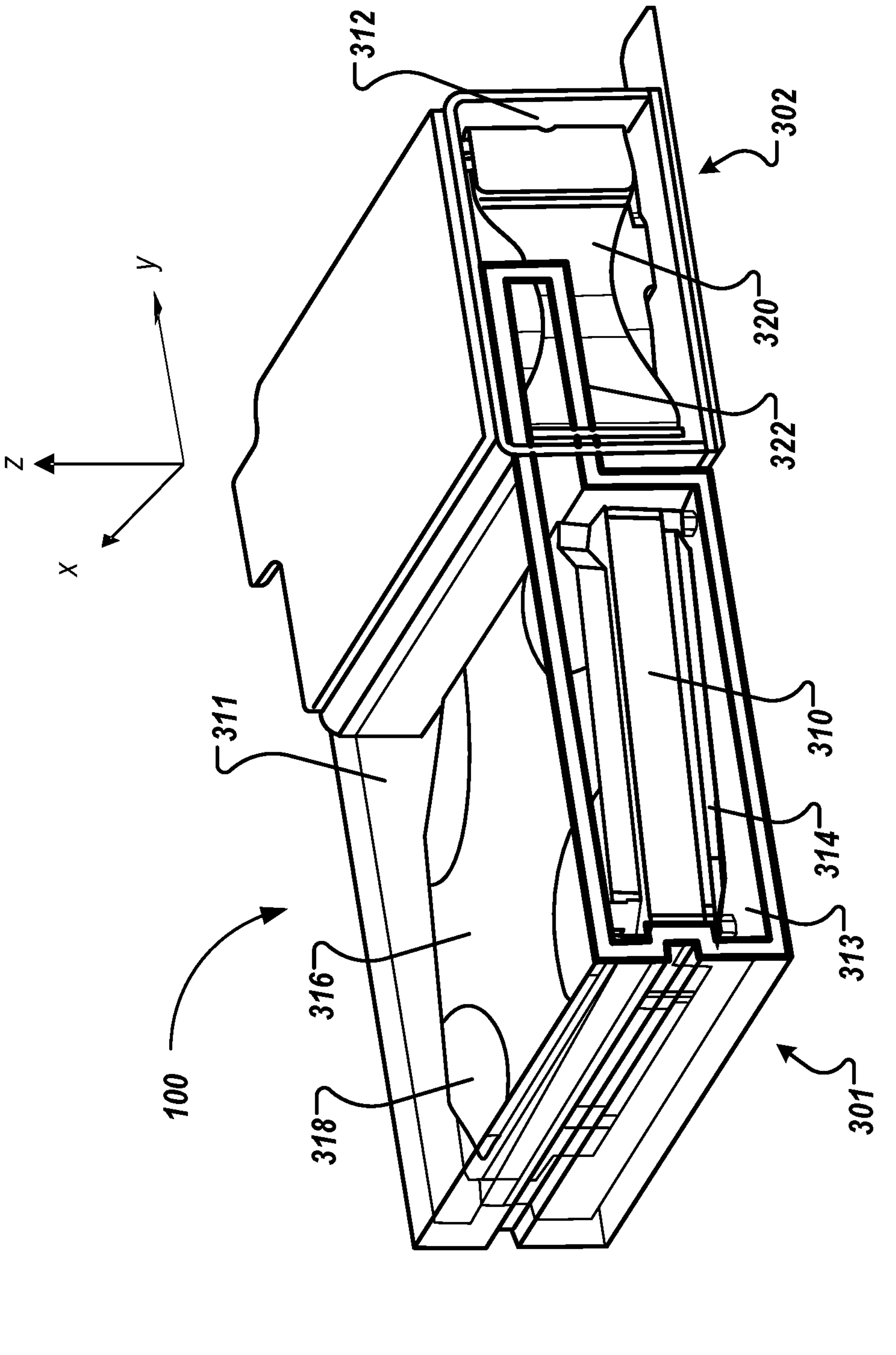
FIG. 3 is a perspective view of an example combined audio and haptic actuator assembly.

Referring to FIG. 3, actuator assembly 100 includes a first housing 301 encompassing an audio actuator 310, and a second housing 302 encompassing a haptic actuator 320. A Cartesian coordinate system is shown in FIG. 3 for reference.

In some examples, the audio actuator 310 includes an electroacoustic transducer, which converts an electrical audio signal into a corresponding sound. Audio output is generated by a vibrating diaphragm 314 of the audio actuator 310. The actuator assembly is operable to generate human-audible sound waves, in the range of 20 Hz to 20 KHz. During operation, the diaphragm 314 of the audio actuator 310 oscillates up and down, along the z-axis.

The first housing 301 encloses the audio actuator 310 and a first open volume 311. The first open volume 311 is a volume of space inside the first housing 301 that is not occupied by the audio actuator 310. Movement of diaphragm to radiate sound forward (downward along the z-axis) toward the surrounding environment also causes sound to be pushed in a rearward direction (upward along the z-axis). For example, sound may propagate through a gas filling the first open volume 311 enclosed by the first housing 301. More particularly, the first open volume 311 can function as a back volume for the audio actuator 310, such that sound travels through air in the first open volume 311.

In some examples, the first housing encloses a front volume 313 and the first open volume 311. The first open volume 311 can be fluidly isolated from the front volume 313. In some examples, the audio actuator fluidly isolates the first open volume 311 from the front volume 313. The front volume 313 can be fluidly connected to the environment. For example, the front volume 313 can vent to the environment through one or more vents in the first housing 301.

The audio actuator 310 includes a yoke, or back plate 316. The diaphragm 314 forms part of a first side of the audio actuator 310 and the back plate 316 forms part of a second side of the audio actuator 310, with the first side being opposite from the second side. The audio actuator 310 is oriented with the back plate 316 facing the first open volume 311 (e.g., facing upward along the z-axis) and the diaphragm 314 facing the front volume 313 (e.g., facing downward along the z-axis). The audio actuator 310 includes venting holes 318. In some examples, the venting holes 318 can be covered by a dush-proof mesh. The venting holes 318 can fluidly connect the portion of the audio actuator 310 that is behind the diaphragm (e.g., above the diaphragm in the z-direction) to the first open volume 311. Thus, fluid (e.g., gas or liquid), such as air, inside the audio actuator 310 behind the diaphragm 314 can vent to the first open volume 311 through the venting holes 318. Though the audio actuator 310 includes four venting holes 318, with one venting hole located at each corner of the audio actuator 310 in the x-y plane, other configurations are possible. For example, the audio actuator can include more or fewer venting holes that vent fluid from inside the audio actuator 310 to the first open volume 311.

In some examples, the first open volume 311 is a volume of space behind the audio actuator 310 (e.g., above the audio actuator in the z-direction) and behind the diaphragm 314. The first open volume 311 can influence acoustic performance of the audio actuator 310. In particular, the size of the first open volume 311 influences the natural resonance peak of audio actuator 310. Generally speaking, increasing the size of the first open volume 311 and thereby increasing the spatial volume occupied by fluid, such as air, in the back volume, can result in the generation of louder bass sounds by the audio actuator 310.

The first open volume 311 can be a spatial volume defined between the audio actuator 310 and an inner surface of the first housing 301. For example, when the audio actuator 310 is mounted in the first housing 301, the first open volume 311 can include the volume of air behind diaphragm 314 and within a rear cavity defined by the inner surface of the first housing 301, including the volume of the rear cavity that is not occupied by components of the audio actuator 310. Sound generated by the movement of diaphragm 314 propagates through first open volume 311, and thus, the size of first open volume 311 influences acoustic performance of the audio actuator 310.

The second housing 302 encloses the haptic actuator 320 and a second open volume 312. In some examples, the haptic actuator 320 is a linear resonant actuator. During operation, a moving mass of the haptic actuator 320 oscillates in a direction perpendicular to the oscillation of the audio actuator. For example, the moving mass of the haptic actuator 320 can oscillate side-to-side along the y-axis. Operations of the haptic actuator 320 are discussed in greater detail with reference to FIG. 4A.

The first open volume 311 is fluidly connected to the second open volume 312, such that fluid (e.g., air) can flow between the first open volume 311 and the second open volume 312.

In some examples, the first open volume 311 and the second open volume 312 are fluidly connected by an aperture between the first housing 301 and the second housing 302. An aperture can include an opening in a side wall of the second housing 302, where the side wall abuts the first housing 301. In some examples, the first open volume 311 and the second open volume 312 can be fluidly connected by one or more large apertures. A large aperture can be, for example, an aperture with a cross-sectional area that is one-half or more of the area of a side wall 420 of the second housing 302. The ratio of the cross-sectional area of the aperture to the cross-sectional area of the side wall can be, e.g., two thirds or greater, three quarters or greater, three fifths or greater, etc. In some examples, no wall separates the first open volume 311 from the second open volume 312. In some examples, the first housing 301 and the second housing 302 can form a single housing. For example, the first housing 301 can be conjoined to the second housing 302, such that one or more outer walls of the first housing 301 are continuous with one or more outer walls of the second housing 302. In some examples, the first housing 301 and the second housing 302 form first and second separate and distinct housings. The first and second housing 301, 302 may have one or more abutting contiguous walls.

By B fluidly connecting the first open volume 311 and the second open volume 312, the effective size of the first open volume 311 is increased. In an example, a size of the first open volume 311 can be approximately 0.50 cubic centimeters (cc). Fluidly connecting the first open volume 311 to the second open volume 312 can increase the effective size of the first open volume 311 from 0.5 cc to greater than 0.6 cc (e.g., greater than 0.7 cc, greater than 0.72 cc, greater than 0.75 cc). In the example of FIG. 3, the effective size increase of the first open volume 311 is represented by a thick boundary 322 extending from the first housing 301 into the second housing 302. Thus, the fluid connection between the first open volume 311 and the second open volume 312 increases an effective size of the back volume for the audio actuator.

The audio actuator 310 can be relatively compact. For example, the audio actuator 310, which has a substantially rectangular profile in the x-y plane, can have an edge length (i.e., in the x- and/or y-directions) of about 16 millimeters (mm) or less. For example, the edge length can be 15 mm, 12 mm, 10 mm, or 8 mm. The actuator assembly's depth (i.e., its dimension in the z-direction) can be about 5.5 mm or less. For example, the actuator assembly's depth can be about 5.0 mm, 4.0 mm, or 3.0 mm. In some examples, a ratio of the length to the width is 1.5 or more. In some examples, a ratio of the length to the width is 2.0 or less.

The haptic actuator 320, which has a substantially rectangular profile in the x-y plane, can have a length (i.e., in the x-directions) of about 16 mm or less. For example, the edge length in the x-direction can be 15 mm, 14 mm, or 13 mm. The width (i.e., in the y-direction) can be about 9.0 mm or less. For example, width in the y-direction can be 8.0 mm, 7.5 mm, or 7.0 mm. The haptic actuator's depth (i.e., its dimension in the z-direction) can be about 5.5 mm or less. For example, the actuator assembly's depth can be about 5.0 mm, 4.5 mm, or 4.0 mm. In some examples, a ratio of the length to the width is 1.5 or more. In some examples, a ratio of the length to the width is 2.5 or less.

Figure 4:
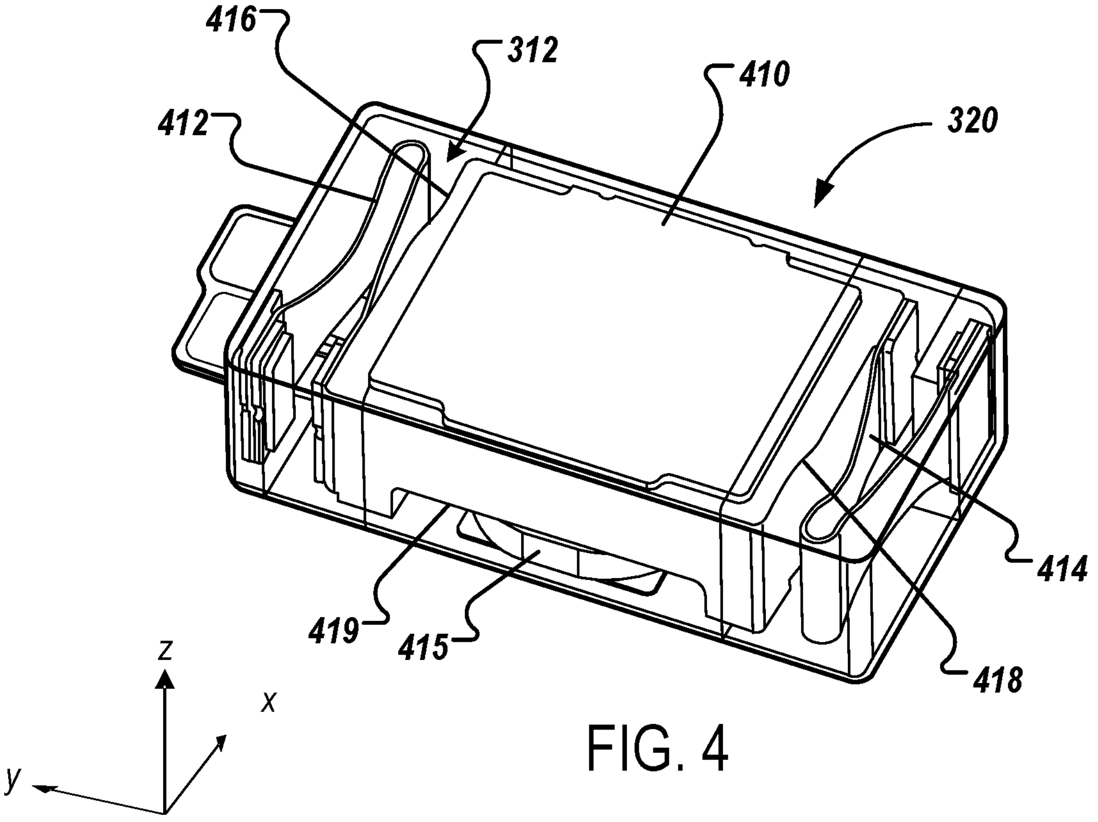
FIG. 4 is a perspective view showing internal components of a haptic actuator

FIG. 4 is a perspective view showing internal components of the haptic actuator 320. The haptic actuator 320 includes a moving mass 410, a first flexure 412, and a second flexure 414.

The first flexure 412 and the second flexure 414 are spring structures that suspend the moving mass 410 within the second housing 302. The first flexure 412 is mechanically coupled to a first side 416 of the moving mass 410. The second flexure 414 is mechanically coupled to a second side 418 of the moving mass 410. The second side 418 is opposite from the first side 416. The first flexure 412 and the second flexure 414 mechanically couple the moving mass 410 to the second housing 302.

During operation, the first flexure 412 and the second flexure 414 expand and compress to permit oscillation of the moving mass 410 along the y-axis. The haptic actuator 320 includes a coil 415 positioned adjacent to a third side 419 of the moving mass 410. The third side 419 connects the first side 416 to the second side 418. During operation, the coil 415 is energized to drive oscillation of the moving mass 410.

As described above, the second housing 302 encompasses the haptic actuator 320 and the second open volume 312. The second open volume 312 is the volume inside the second housing 302 that is not occupied by the moving mass 410, the first flexure 412, the second flexure 414, or the coil 415. The second open volume 312 can be approximately 0.3 cc or less. For example, the second open volume 312 can be about 0.25 cc, 0.22 cc, or 0.20 cc. In some examples, the second open volume 312 occupies thirty percent or more of the space enclosed by the second housing 302.

Figure 5:
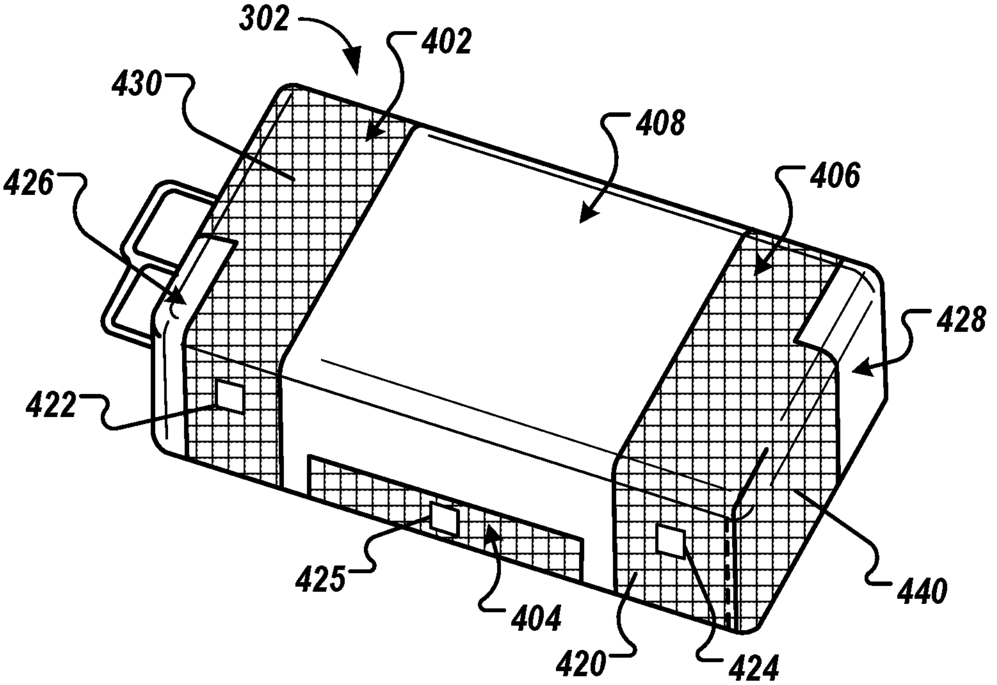
FIG. 5 is a perspective view of a haptic actuator housing.

FIG. 5 is a perspective view of the second housing 302 for the haptic actuator 320. The second housing 302 includes a side wall 420. In some examples, when integrated into an actuator assembly, the side wall 420 abuts a wall of the first housing 301 for the audio actuator 310. In some examples, when integrated into an actuator assembly, the side wall 420 abuts a linking component that links the second housing 302 to the first housing 301.

The side wall 420 includes openings 422, 424, 425. The opening 422 is positioned adjacent to a region within the second housing 302 where the first flexure 412 is located. The opening 424 is positioned adjacent to a region within the second housing 302 where the second flexure 414 is located. The opening 425 is positioned adjacent to a region within the second housing 302 where the coil 415 is located.

The openings 422, 424, 425 are holes that extend through the side wall 420. The openings 422, 424, 425 permit air to flow through the side wall 420. Air can flow into the second open volume 312 and out of the second open volume 312 through any of the openings 422, 424, 425.

When the second housing 302 is integrated into an actuator assembly and is positioned adjacent to the first housing 301, the opening 422 connects the first open volume 311 inside the first housing 301 with the second open volume 312 inside the second housing 302 through a portion of the second housing 302 containing the first flexure 412. The opening 424 connects the first open volume 311 inside the first housing 301 with the second open volume 312 inside the second housing 302 through a portion of the second housing 302 containing the second flexure 414. The opening 425 connects the first open volume 311 inside the first housing 301 with the second open volume 312 inside the second housing 302 through a portion of the second housing 302 containing the coil 415.

Although illustrated in FIG. 5 as having three openings, the side wall 420 can include more or fewer openings. For example, the side wall 420 can include one opening, two openings, four openings, or five or more openings. The openings can be positioned at any location around the surface of the second housing 302 that corresponds to open volume inside the second housing 302.

Areas of the surface of the second housing 302 where openings can be located are represented in FIG. 5 as being shaded with a grid pattern. Thus, openings can be located in areas 402, 404, 406, or any combination of these.

Areas 426 and 428 of the second housing 302 are areas where the flexures 412, 414 connect to the inside of the second housing 302. The areas 426, 428 of the second housing 202 are represented in FIG. 5 as unshaded areas, and should not include any openings. Thus, any openings in the second housing 202 should avoid the areas 426, 428 such that the openings do not overlap with the areas 426, 428. Similarly, area 408 contains the moving mass 410, and should not include any openings, and any openings in the second housing 202 should avoid the area 408 such that the openings do not overlap with the area 408.

Although illustrated in FIG. 5 as being in the side wall 420, the openings can be in other walls of the second housing 302. For example, the openings can be located on a top wall 430 or end wall 440 of the second housing 302. In some examples, some openings can be located on the side wall 420, and other openings can be located on a different wall, or multiple different walls, of the second housing 302.

The openings 422, 424, 425 can each have a rectangular shape, e.g., with dimensions of 2.0 mm by 3.00 mm. In some examples, the openings have cross-sectional areas of nine square millimeters (sq. mm) or less. For example, the openings can have cross-sectional areas of eight sq. mm or less, seven sq. mm or less, six sq. mm or less. In some examples, the openings 422, 424, 425 can each have the same shape, or can have different shapes from each other. In some examples, an opening can have a square, circular, oval, or elliptical shape.

The side wall 420 can have an area of 70 sq. mm or less (e.g., 68 sq. mm or less, 66 sq. mm or less). For example, the side wall 420 can have a length of 15 mm (i.e., in the y-direction) and a height of 4.5 mm (i.e., in the z-direction).

Figure 6A:
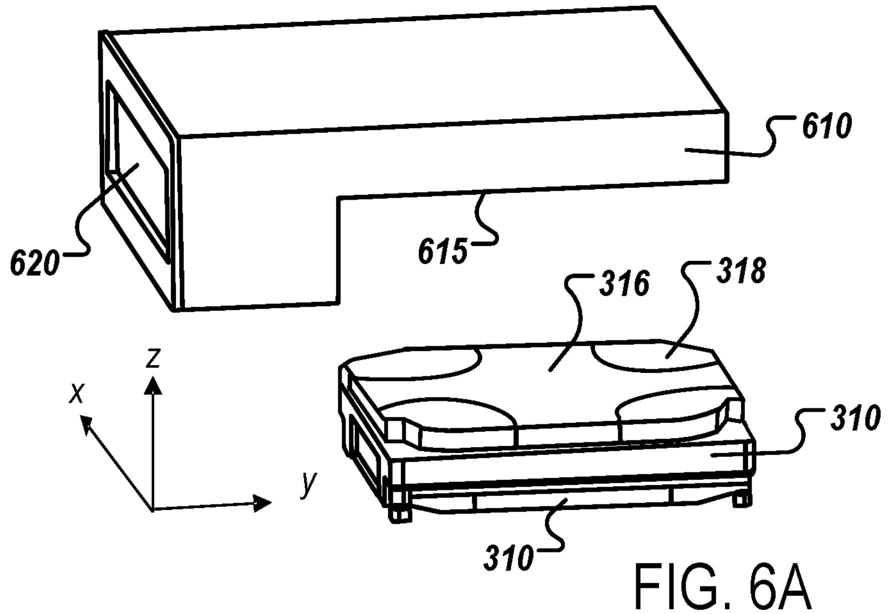
FIGS. 6A to 6C are perspective views showing an example process for linking an audio actuator to a haptic actuator.
Figure 6B:
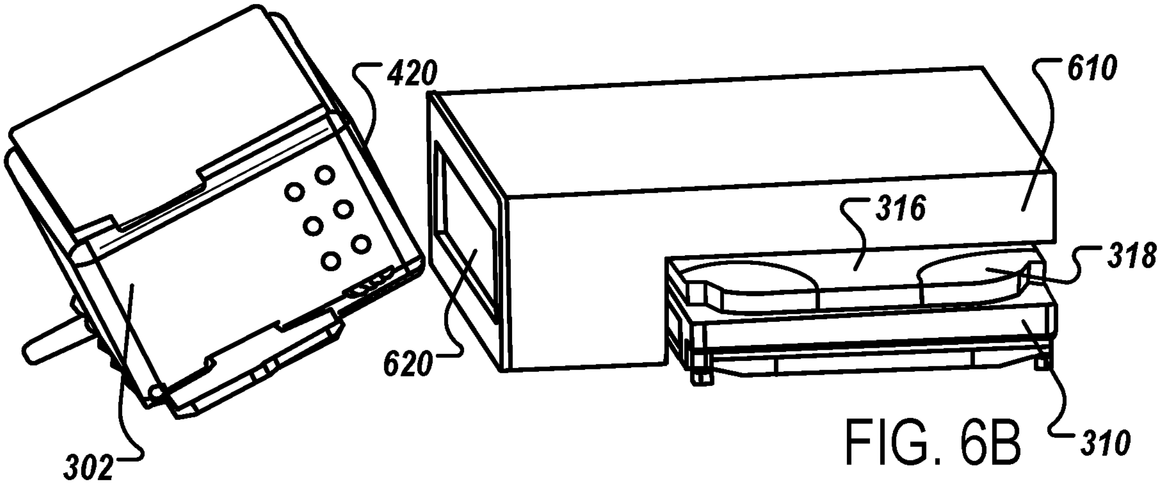
Figure 6C:
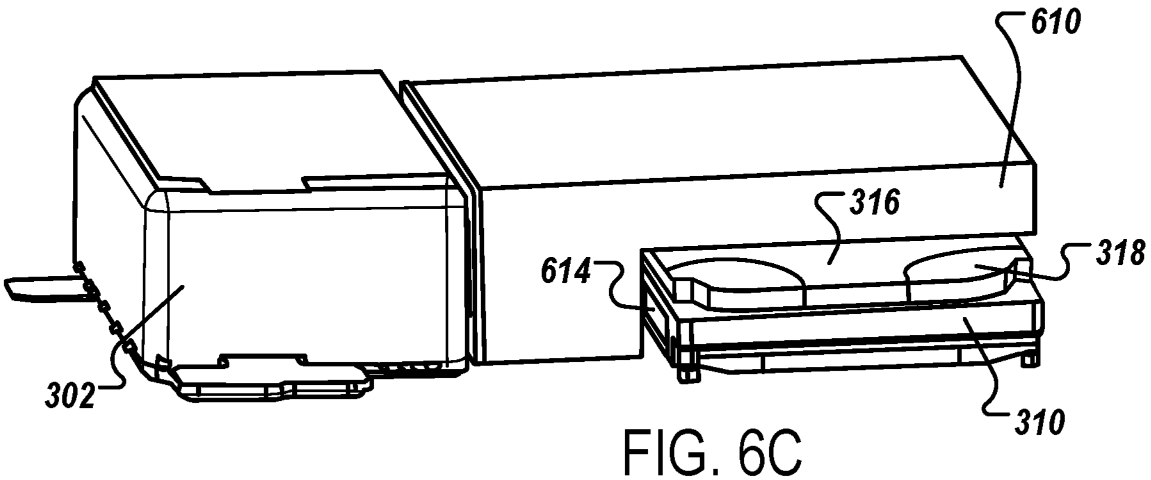

FIGS. 6A to 6C are perspective views showing steps of an example process for linking an audio actuator to a haptic actuator. In the example of FIGS. 6A to 6C, the first housing 301 includes a customized speaker box 610. The speaker box 610 is configured to mechanically connect to the second housing 302. The speaker box 610 can function as a linking component joining the actuator 310 to the second housing 302.

The speaker box 610 includes a fluid conduit 620. The fluid conduit 620 extends from a back volume (e.g., first open volume 311) of the audio actuator 310 to an opening in the side wall 420 of the second housing 302. This permits air to flow between the second housing 302 and the back volume. In this way, the audio actuator 310 and the haptic actuator 320 share the second open volume 312 within the second housing 302.

In FIG. 6A, the speaker box 610 is joined to the audio actuator 310 such that an underside 615 of the speaker box 610 aligns with the back plate 316 of the audio actuator 310. The speaker box 610 having fluid conduit 620 is provided. The audio actuator 610 is joined (e.g., mechanically coupled) to the speaker box 610 such that the back volume of the audio actuator 610 is fluidly connected to the fluid conduit 620. Fluid displaced by the diaphragm 314 in the upward z-direction can vent through the venting holes 318 to the fluid conduit 620.

In FIG. 6B, the speaker box 610 is joined to the second housing 302 such that the conduit 620 is aligned with the side wall 420. The second housing 302 enclosing haptic actuator 320 is provided. The side wall 420 includes one or more openings. The speaker box 610 is joined (e.g., mechanically coupled) to the second housing 302 with the one or more openings of the side wall 420 aligning with the fluid conduit 620. Thus, the back volume of the audio actuator 610 is fluidly connected to the second housing 602 through the fluid conduit 620. With the second housing 302 joined to the speaker box 610, fluid displaced by the diaphragm 314 in the upward z-direction can vent through the venting holes 318, to the fluid conduit 620, through the openings of the side wall 420, to the second open volume 312 inside the second housing 302.

In FIG. 6C, the actuator assembly is shown including the second housing 302, the speaker box 610, and the audio actuator 310. The speaker box 610 functions as a linking component that mechanically connects the audio actuator 310 to the second housing 302. Although shown in FIG. 6C as aligning with the back plate 316 and side 614 of the audio actuator 310, in some examples the speaker box 610 aligns with other sides of the audio actuator 310. For example, the speaker box 610 can be configured to wrap around three or more sides of the audio actuator 310.

Figure 7:
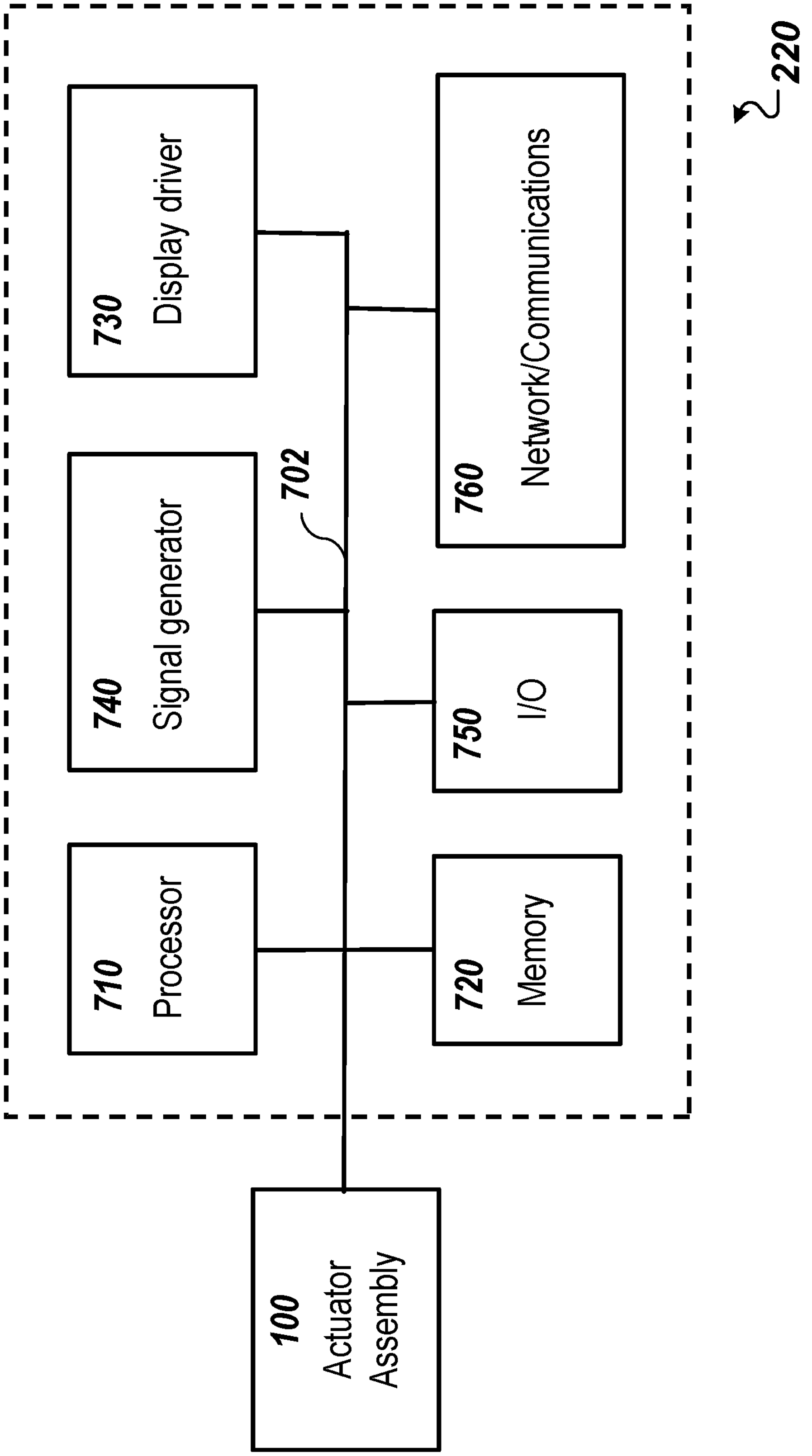
FIG. 7 is a schematic diagram of an embodiment of an electronic control module for a mobile device.

Referring to FIG. 7, an exemplary electronic control module 220 of a mobile device, such as mobile device 150, includes a processor 710, memory 720, a display driver 730, a signal generator 740, an input/output (I/O) module 750, and a network/communications module 760. These components are in electrical communication with one another (e.g., via a signal bus 702) and with actuator assembly 100.

Processor 710 may be implemented as any electronic device capable of processing, receiving, or transmitting data or instructions. For example, processor 710 can be a microprocessor, a central processing unit (CPU), an application-specific integrated circuit (ASIC), a digital signal processor (DSP), or combinations of such devices.

Memory 720 has various instructions, computer programs or other data stored thereon. The instructions or computer programs may be configured to perform one or more of the operations or functions described with respect to the mobile device. For example, the instructions may be configured to control or coordinate the operation of the device's display via display driver 730, signal generator 740, one or more components of I/O module 750, one or more communication channels accessible via network/communications module 760, one or more sensors (e.g., biometric sensors, temperature sensors, accelerometers, optical sensors, barometric sensors, moisture sensors and so on), and/or actuator assembly 100.

Signal generator 740 is configured to produce AC waveforms of varying amplitudes, frequency, and/or pulse profiles suitable for actuator assembly 100 and producing acoustic and/or haptic responses via the actuator. Although depicted as a separate component, in some embodiments, signal generator 740 can be part of processor 710. In some embodiments, signal generator 740 can include an amplifier, e.g., as an integral or separate component thereof.

The electronic control module 220 is electrically coupled to the actuator assembly 100. The electronic control module 220 is configured to generate a haptic signal for generating haptic response from the haptic actuator 320. The haptic signal is an electrical signal, such as a voltage or current waveform. The electronic control module 220 may be programmed to receive a touch input from the display 104 and generate the haptic signal based on the received touch input to provide the haptic response to the user.

Memory 720 can store electronic data that can be used by the mobile device. For example, memory 720 can store electrical data or content such as, for example, audio and video files, documents and applications, device settings and user preferences, timing and control signals or data for the various modules, data structures or databases, and so on. Memory 720 may also store instructions for recreating the various types of waveforms that may be used by signal generator 740 to generate signals for actuator assembly 100. Memory 720 may be any type of memory such as, for example, random access memory, read-only memory. Flash memory, removable memory, or other types of storage elements, or combinations of such devices.

As briefly discussed above, electronic control module 220 may include various input and output components represented in FIG. 7 as I/O module 750. Although the components of I/O module 750 are represented as a single item in FIG. 7, the mobile device may include a number of different input components, including buttons, microphones, switches, and dials for accepting user input. In some embodiments, the components of I/O module 750 may include one or more touch sensors and/or force sensors. For example, the mobile device's display may include one or more touch sensors and/or one or more force sensors that enable a user to provide input to the mobile device.

Each of the components of I/O module 750 may include specialized circuitry for generating signals or data. In some cases, the components may produce or provide feedback for application-specific input that corresponds to a prompt or user interface object presented on the display.

As noted above, network/communications module 760 includes one or more communication channels. These communication channels can include one or more wireless interfaces that provide communications between processor 710 and an external device or other electronic device. In general, the communication channels may be configured to transmit and receive data and/or signals that may be interpreted by instructions executed on processor 710. In some cases, the external device is part of an external communication network that is configured to exchange data with other devices. Generally, the wireless interface may include, without limitation, radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, Near Field Communication interfaces, infrared interfaces, USB interfaces. Wi-Fi interfaces. TCP/IP interfaces, network communications interfaces, or any conventional communication interfaces.

In some implementations, one or more of the communication channels of network/communications module 760 may include a wireless communication channel between the mobile device and another device, such as another mobile phone, tablet, computer, or the like. In some cases, output, audio output, haptic output or visual display elements may be transmitted directly to the other device for output. For example, an audible alert or visual warning may be transmitted from the mobile device 150 to a mobile phone for output on that device and vice versa. Similarly, the network/communications module 760 may be configured to receive input provided on another device to control the mobile device. For example, an audible alert, visual notification, or haptic alert (or instructions therefor) may be transmitted from the external device to the mobile device for presentation.

The actuator technology disclosed herein can be used in a device such as a smartphone, tablet computer, or wearable devices (e.g., smartwatch or head-mounted device, such as smart glasses).

Other embodiments are in the following claims.

What is claimed is:

1. An actuator assembly comprising:

a first housing enclosing an audio actuator and a first open volume; and a second housing enclosing a haptic actuator and a second open volume, wherein:

a first wall of the first housing abuts a second wall of the second housing, and the first open volume is fluidly connected with the second open volume by an aperture between the first housing and the second housing.

2. An actuator assembly comprising:

a first housing enclosing an audio actuator and a first open volume; and a second housing enclosing a haptic actuator and a second open volume, wherein the first open volume is fluidly connected with the second open volume by an aperture between the first housing and the second housing, the aperture comprising:

a first opening in a first wall of the first housing; and a second opening in a second wall of the second housing.

3. An actuator assembly comprising:

a plurality of housings including:

a first housing enclosing an audio actuator and a first open volume; and a second housing enclosing a haptic actuator and a second open volume, wherein:

the first open volume is fluidly connected with the second open volume by an aperture between the first housing and the second housing, the aperture is formed in a surface of the second housing to fluidly connect the first open volume with the second open volume, and the first housing comprises a linking component configured to mechanically connect to the second housing, wherein the linking component includes a fluid conduit extending from the first open volume to the aperture in the surface of the second housing.

4. An actuator assembly comprising:

a plurality of housings including:

a first housing enclosing an audio actuator and a first open volume; and a second housing enclosing a haptic actuator and a second open volume, wherein:

the first open volume is fluidly connected with the second open volume by an aperture between the first housing and the second housing, the aperture is formed in one or more surfaces of the plurality of housings to fluidly connect the first open volume with the second open volume, and the haptic actuator comprises:

a moving mass; and a plurality of spring structures, including:

a first spring structure mechanically coupled to a first side of the moving mass; and a second spring structure mechanically coupled to a second side of the moving mass, the second side being opposite from the first side.

5. The actuator assembly of claim 4, wherein the aperture fluidly connects the first open volume with the second open volume through a portion of the second housing containing one of the plurality of spring structures.

6. The actuator assembly of claim 4, further comprising a second aperture fluidly connecting the first open volume and the second open volume, wherein:

the aperture fluidly connects the first open volume with the second open volume through a portion of the second housing containing the first spring structure; and the second aperture fluidly connects the first open volume with the second open volume through a portion of the second housing containing the second spring structure.

7. The actuator assembly of claim 4, further comprising a second aperture fluidly connecting the first open volume and the second open volume, wherein the haptic actuator comprises:

a coil positioned adjacent to a third side of the moving mass, the third side connecting the first side of the moving mass to the second side of the moving mass, wherein:

the aperture fluidly connects the first open volume with the second open volume through a portion of the second housing containing the first spring structure; and the second aperture fluidly connects the first open volume with the second open volume through a portion of the second housing containing the coil.

8. The actuator assembly of claim 7, further comprising a third aperture fluidly connecting the first open volume and the second open volume, wherein the third aperture fluidly connects the first open volume with the second open volume through a portion of the second housing containing the second spring structure.

9. An actuator assembly comprising:

a plurality of housings including:

a first housing enclosing an audio actuator and a first open volume; and a second housing enclosing a haptic actuator and a second open volume, wherein:

the first open volume is fluidly connected with the second open volume by an aperture between the first housing and the second housing, the aperture is formed in one or more surfaces of the plurality of housings to fluidly connect the first open volume with the second open volume, and the haptic actuator comprises:

a moving mass;

a spring structure mechanically coupling the moving mass to the second housing; and a coil configured to drive oscillation of the moving mass during operation of the haptic actuator, wherein the aperture fluidly connects the first open volume with the second open volume through a portion of the second housing containing at least one of the spring structure or the coil.

10. The actuator assembly of claim 2, wherein the haptic actuator comprises:

a moving mass; and a spring structure mechanically coupling the moving mass to the second housing at a connection region, wherein the second opening in the second wall of the second housing does not overlap with the connection region.

11. An actuator assembly comprising:

a plurality of housings including:

a first housing enclosing an audio actuator and a first open volume; and a second housing enclosing a haptic actuator and a second open volume, wherein:

the first open volume is fluidly connected with the second open volume by an aperture between the first housing and the second housing, the aperture is formed in one or more surfaces of the plurality of housings to fluidly connect the first open volume with the second open volume, and the aperture has a cross-sectional area of six square millimeters or less.

12. The actuator assembly of claim 2, wherein the haptic actuator comprises a linear resonant actuator.

13. An actuator assembly comprising:

a plurality of housings including:

a first housing enclosing an audio actuator and a first open volume; and a second housing enclosing a haptic actuator and a second open volume, wherein:

the first open volume is fluidly connected with the second open volume by an aperture between the first housing and the second housing;

the aperture is formed in one or more surfaces of the plurality of housings to fluidly connect the first open volume with the second open volume;

the first housing encloses a front volume that abuts a first side of the audio actuator and is vented to the environment;

the first open volume abuts a second side of the audio actuator, wherein the first side of the audio actuator is opposite from the second side of the audio actuator; and the first open volume is fluidly isolated from the front volume.

14. The actuator assembly of claim 2, wherein the first open volume comprises a back volume for the audio actuator, wherein a resonance peak of the audio actuator depends at least in part on a size of the back volume, wherein the fluid connection between the first open volume and the second open volume increases an effective size of the back volume for the audio actuator.

15. An electronic device, comprising:

an actuator assembly comprising:

a first housing enclosing an audio actuator and a first open volume; and a second housing enclosing a haptic actuator and a second open volume, wherein:

a first wall of the first housing abuts a second wall of the second housing, and the first open volume is fluidly connected with the second open volume by an aperture between the first housing and the second housing.

16. A method for assembling an actuator assembly, comprising:

providing a speaker box including a fluid conduit;

joining the speaker box to an audio actuator to fluidly connect a first open volume of the audio actuator with the fluid conduit; and joining the speaker box with a housing enclosing a haptic actuator to fluidly connect a second open volume of the housing with the fluid conduit, wherein the fluid conduit includes an aperture formed in a surface of the speaker box, the fluid conduit configured to fluidly connect the first open volume with the second open volume when the actuator assembly is assembled.

17. The method of claim 16, wherein the second open volume of the housing is fluidly connected to the fluid conduit through one or more apertures in a wall of the housing.

18. The method of claim 16, comprising assembling the actuator assembly such that a moving mass of the haptic actuator is configured to oscillate in a direction perpendicular to a direction of oscillation of the audio actuator.

* * * * *